United States Patent
Tozuka et al.

(10) Patent No.: US 6,711,463 B2
(45) Date of Patent: Mar. 23, 2004

(54) METHOD AND APPARATUS FOR MANAGING DELIVERY DESTINATION OF BAGGAGE

(75) Inventors: Kentaro Tozuka, Kawasaki (JP); Yuji Abumiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/269,873

(22) Filed: Oct. 15, 2002

(65) Prior Publication Data

US 2003/0176945 A1 Sep. 18, 2003

(30) Foreign Application Priority Data

Mar. 18, 2002 (JP) .......................... 2002-074999

(51) Int. Cl.⁷ .............................. G06F 7/00; G06F 17/60
(52) U.S. Cl. .............................. 700/225; 700/226; 705/5
(58) Field of Search ................................. 700/225, 226; 705/5, 28

(56) References Cited

U.S. PATENT DOCUMENTS 5,793,639 A * 8/1998 Yamazaki ................... 700/226
6,119,096 A * 9/2000 Mann et al. .................... 705/5
6,509,829 B1 * 1/2003 Tuttle ......................... 340/10.1
6,512,964 B1 * 1/2003 Quackenbush et al. ..... 700/226
6,594,547 B2 * 7/2003 Manabe et al. ............. 700/225

FOREIGN PATENT DOCUMENTS

JP        05-073572          3/1993

* cited by examiner

Primary Examiner—Gene O. Crawford
(74) Attorney, Agent, or Firm—Staas & Halsey LLP

(57) ABSTRACT

An object of this invention is to securely deliver a baggage of a traveler a delivery destination designated by the traveler even in a case where the traveler cancels the travel or changes the destination. First, identification information, information of a contact address, boarding information, and information concerning the delivery destination of the baggage are received from a delivery receipt terminal and registered in a contract database. Then, information concerning boarding status of the traveler is acquired from a passenger carrier server, which manages the boarding status of the baggage. If there is inconsistency between the acquired information concerning the boarding status and the boarding information registered in the contract database, the delivery destination of the baggage is inquired to the traveler's contact address, and the information concerning the delivery destination, which is notified from the traveler in response to the inquiry, is registered in the contract database.

27 Claims, 13 Drawing Sheets

FIG.4

| DATE | FLIGHT NAME | PASSENGER'S NAME | PROCESSING NO. |
|---|---|---|---|
| APRIL 1 | 322 | ICHIRO YAMATO | 32211 |

FIG.5

| DATE | FLIGHT NAME | PASSENGER'S NAME | PROCESSING NO. | BOARDING RESULT | DATE AFTER CHANGE | FLIGHT NAME AFTER CHANGE |
|---|---|---|---|---|---|---|
| APRIL 1 | 322 | ICHIRO YAMATO | 32211 | CHANGED | APRIL 2 | 333 |
| APRIL 1 | 321 | TARO FUJI | 32212 | CHANGED | APRIL 2 | 334 |
| APRIL 1 | 321 | HANAKO FUJI | 32213 | BOARDING | — | — |

FIG.7

| NAME | CONTACT ADDRESS | DELIVERY DESTINATION | INFORMATION SPECIFYING BOARDING FLIGHT | DELIVERY DESTINATION AT CANCELLATION |
|---|---|---|---|---|
| ICHIRO YAMATO | Yamato@pat.com | C BUILDING, B CITY, A PREFECTURE | APRIL 1, 322 | F BUILDING, E CITY, D PREFECTURE |

| NAME | |
|---|---|
| CONTACT ADDRESS | |
| DELIVERY DESTINATION | |
| DELIVERY DESTINATION AT CANCELLATION | |

INFORMATION SPECIFYING
BOARDING FLIGHT

| BOARDING DATE | |
|---|---|
| BOARDING FLIGHT | |

SEND    CANCEL

| NAME | CONTACT ADDRESS | DELIVERY DESTINATION | INFORMATION SPECIFYING BOARDING FLIGHT | | DELIVERY DESTINATION AT CANCELLATION | DELIVERY FLAG |
|---|---|---|---|---|---|---|
| ICHIRO YAMATO | Yamato@pat.com | C BUILDING, B CITY, A PREFECTURE | APRIL 1 | 322 | F BUILDING, E CITY, D PREFECTURE | IMPOSSIBLE |
| TARO FUJI | tarou@pat.com | C BUILDING, B CITY, A PREFECTURE | APRIL 1 | 321 | F BUILDING, E CITY, D PREFECTURE | IMPOSSIBLE |
| HANAKO FUJI | hanako@pat.com | C BUILDING, B CITY, A PREFECTURE | APRIL 1 | 321 | F BUILDING, E CITY, D PREFECTURE | COMPLETE |
| SAKURA FUJI | sakura@pat.com | C BUILDING, B CITY, A PREFECTURE | — | — | — | POSSIBLE |

| FLIGHT SPECIFYING INFORMATION | DATE | DEPARTURE TIME SPECIFYING INFORMATION | DESTINATION |
|---|---|---|---|
| 321 | APRIL 1 | 10:00 | SAPPORO |
| 322 | APRIL 1 | 11:00 | HAKODATE |
| 323 | APRIL 1 | 12:00 | OSAKA |
| 333 | APRIL 2 | 11:00 | HAKODATE |
| 334 | APRIL 2 | 11:00 | OITA |

FIG.14

| NAME | INFORMATION SPECIFYING BOARDING FLIGHT |
|---|---|
| ICHIRO YAMATO | 322 |

FIG.15

| DATE | FLIGHT NAME | PASSENGER'S NAME | PROCESSING NUMBER | BOARDING RESULT | DATE AFTER CHANGE | BOARDING FLIGHT NAME AFTER CHANGE |
|---|---|---|---|---|---|---|
| APRIL 1 | 322 | ICHIRO YAMATO | 32211 | CHANGED | APRIL 2 | 333 |

METHOD AND APPARATUS FOR MANAGING DELIVERY DESTINATION OF BAGGAGE

TECHNICAL FIELD OF THE INVENTION

This invention relates to a technique for securely delivering a traveler's baggage to an address designated by the traveler, even in a case where the traveler canceled his or her travel or changed his or her destination.

BACKGROUND OF THE INVENTION

In a case where a traveler has to send a baggage, such as a golf bag or ski goods, to the travel destination, he or she may request a parcel delivery company to deliver it. But, in a case where the traveler cancels his or her travel or changes his or her destination just before the travel, the baggage is still delivered to the travel destination, and if he or she doesn't request to send back the baggage, it is left in the travel destination.

SUMMARY OF THE INVENTION

An object of the invention is therefore to provide a technique for securely delivering a traveler's baggage to an address designated by the traveler even in a case where the traveler canceled his or her travel or changed the travel destination.

According to a first aspect of the invention, a method for managing a delivery destination comprises the steps of: receiving and registering into a storage device, identification information of a traveler, information of a contact address, boarding information, and information concerning a destination of a baggage from a delivery receipt terminal operated by the traveler; acquiring information concerning a boarding status of the traveler from a passenger carrier server for managing the boarding status of the traveler; if there is inconsistency between the information concerning the boarding status of the traveler, which is acquired in the acquiring step, and the boarding information registered in the storage device, inquiring the traveler about delivery destination of the baggage based on the information of the contact address of the traveler; and registering information concerning the delivery destination of the baggage, which is notified from the traveler in response to the inquiry by the inquiring step.

By doing so, since it is necessary for the traveler only to input the identification information of the traveler, information of the contact address, the boarding information, and the information concerning the destination of the baggage from the delivery receipt terminal, and to designate the delivery destination of the baggage for the inquiry even in a case where there is cancellation of the travel or a change of the travel destination, a simple procedure is only requested to send his or her baggage to an appropriate place. Besides, it becomes possible to surely deliver the traveler's baggage to the address designated by the traveler.

Besides, the method may further comprise a step of outputting a delivery instruction including information of the delivery destination of the baggage based on the information concerning the delivery destination of the baggage, which is registered in the storage device. It becomes possible for staffs of the carrier to surely deliver the address designated by the traveler.

Besides, in the aforementioned step of registering information concerning the delivery destination of the baggage, the information concerning the delivery destination of the baggage, which is registered at the receiving and registering step, may be updated by the information concerning the delivery destination of the baggage, which is notified from the traveler.

Besides, the information concerning the delivery destination of the baggage, which is registered in the storage device at the receiving and registering step, may include normal delivery destination information of the baggage and delivery destination information of the baggage at cancellation of the travel. It becomes easy to designate the destination at the cancellation of the travel.

Besides, in the aforementioned step of registering information concerning the delivery destination of the baggage, if designation of a new delivery destination of the baggage is received as the delivery destination of the baggage from the traveler in response to the inquiry by the inquiring step, the information concerning the delivery destination of the baggage, which is registered in the storage device, may be updated by using information of the new delivery destination of the baggage. By doing so, it becomes possible to surely deliver the traveler's baggage to the delivery destination designated by the traveler.

Besides, in the aforementioned step of registering information concerning the delivery information of the baggage, if designation of the delivery destination, which is notified from the traveler, is designation of the delivery destination of the baggage at the cancellation of the travel, the normal delivery destination information of the baggage may be updated by the delivery destination information of the baggage at the cancellation of the travel. It is possible to surely handle the baggage even at the cancellation of the travel.

Besides, in the aforementioned acquiring step, the information concerning the boarding status of the traveler, which corresponds to the boarding information, may be requested to the passenger carrier server at timing according to a departure time specified by the boarding information. By doing so, it becomes possible to surely grasp the boarding status of the traveler.

Besides, a storage area for a delivery flag may be provided in the storage device, and the delivery flag may be set to a state indicating delivery possible in at least a case where there is consistency between the information concerning the boarding status of the traveler and the boarding information registered in the storage device, and the aforementioned outputting step may be executed in a case where the delivery flag is set to the state indicating delivery possible. By doing so, it becomes possible to deliver the baggage of the traveler to the address designated by the traveler at an appropriate timing.

Besides, according to a second aspect of the invention, a method for applying a delivery of a baggage, comprises the steps of: receiving from a computer and displaying on a display device, data for prompting a traveler to input at least identification information of the traveler, information of a contact address, boarding information, and information concerning delivery destination of the baggage at an application time of the baggage delivery; and accepting from the traveler and transmitting to the computer, at least the identification information of the traveler, the information of the contact address, the boarding information, and the information concerning the delivery destination of the baggage. In delivery application of the baggage, the boarding information of his or her travel can be registered together with the information for the baggage.

Incidentally, the method according to the first aspect of the invention can be executed through a program and a computer. This program is stored in a storage medium or a storage device such as, for example, a flexible disk, a CD-ROM, a magneto-optical disk, a semiconductor memory, or a hard disk. Besides, there is also a case where the program is distributed through a network or the like. Incidentally, an intermediate processing result is temporarily held in a memory.

BRIEF DESCRIPTION OF THE DRAWINGS

FIG. 4 is a drawing showing an example of a message for the boarding reservation;

FIG. 5 is a drawing showing an example of a configuration of a boarding database (DB);

FIG. 7 is a drawing showing an example of a message to indicate receipt of the baggage;

FIG. 8 is a drawing showing an example of a configuration of a contract DB;

FIG. 13 is a drawing showing an example of a configuration of a timetable DB;

FIG. 14 is a drawing showing an example of a boarding inquiry message;

FIG. 15 is a drawing showing an example of a reply message;

DETAIL DESCRIPTION OF THE PREFERRED EMBODIMENTS

Figure 1:
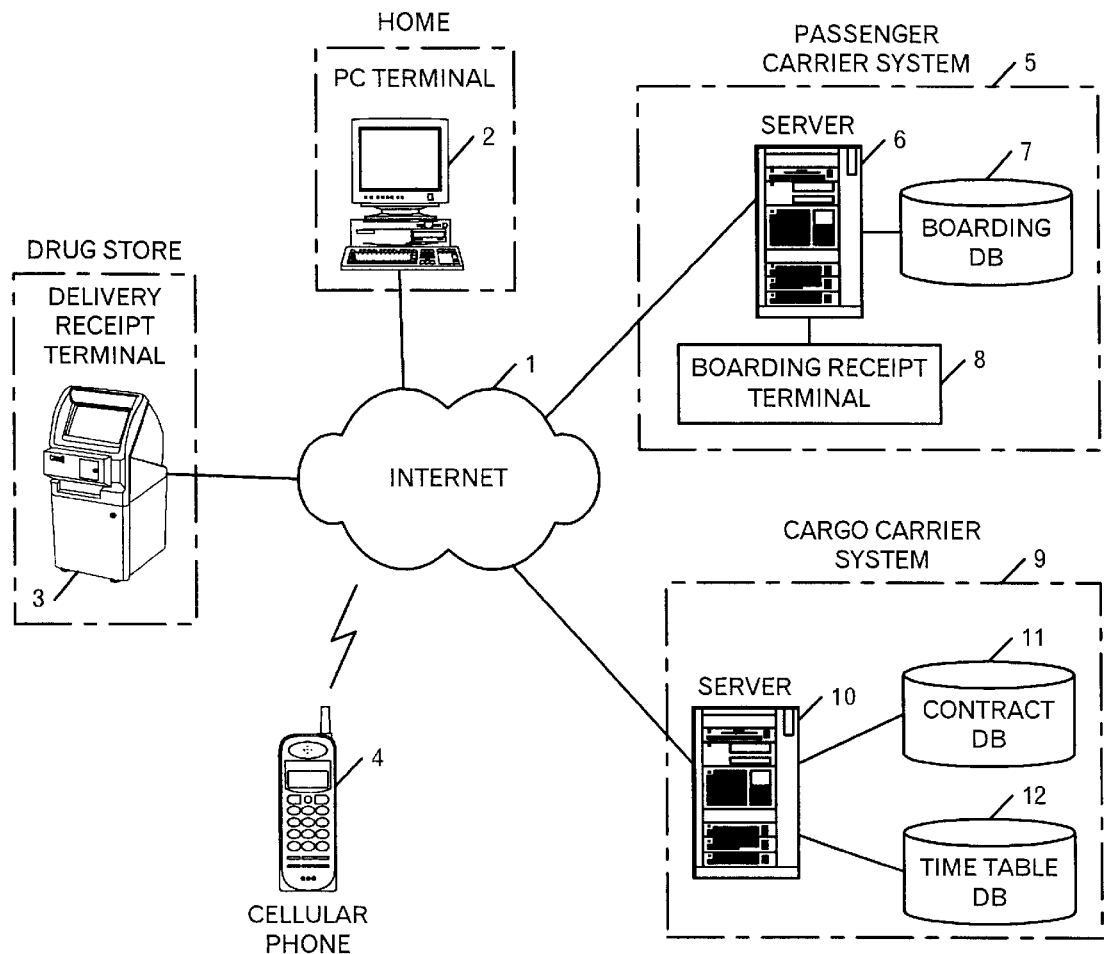
FIG. 1 is a drawing showing an example of a system configuration in an embodiment of the invention.

FIG. 1 shows a drawing of a system outline according to an embodiment of the invention. This embodiment explains a case where a traveler travels on an airplane. The Internet 1, which is a computer network, is connected to a PC (Personal Computer) terminal 2, which is installed in the home of the traveler and is operated at the reservation of the traveler's boarding flight and has a web browser function, a delivery receipt terminal 3, which is installed in a drug store and to which the traveler designates and inputs the delivery destination of the baggage and the like, and a cellular phone 4, which is held by the traveler and has a mailer function and web browser function. In addition, the Internet 1 is connected with a passenger carrier system 5, which is managed and operated by a passenger carrier and includes at least a server 6, a boarding DB 7 for registering boarding reservation information of a traveler, which is received from the PC terminal 2 via the server 6, and a boarding receipt terminal 8 installed on the counter of the boarding receipt in an airport. Furthermore, the Internet 1 is also connected with a cargo carrier system 9, which is managed and operated by the cargo carrier and includes at least a server 10, a contract DB 11 for registering information concerning the destination of the traveler's baggage, which is received from the delivery receipt terminal 3 via the server 10, and a timetable DB 12, which registers a name of a boarding flight and a departure time.

Figure 2:
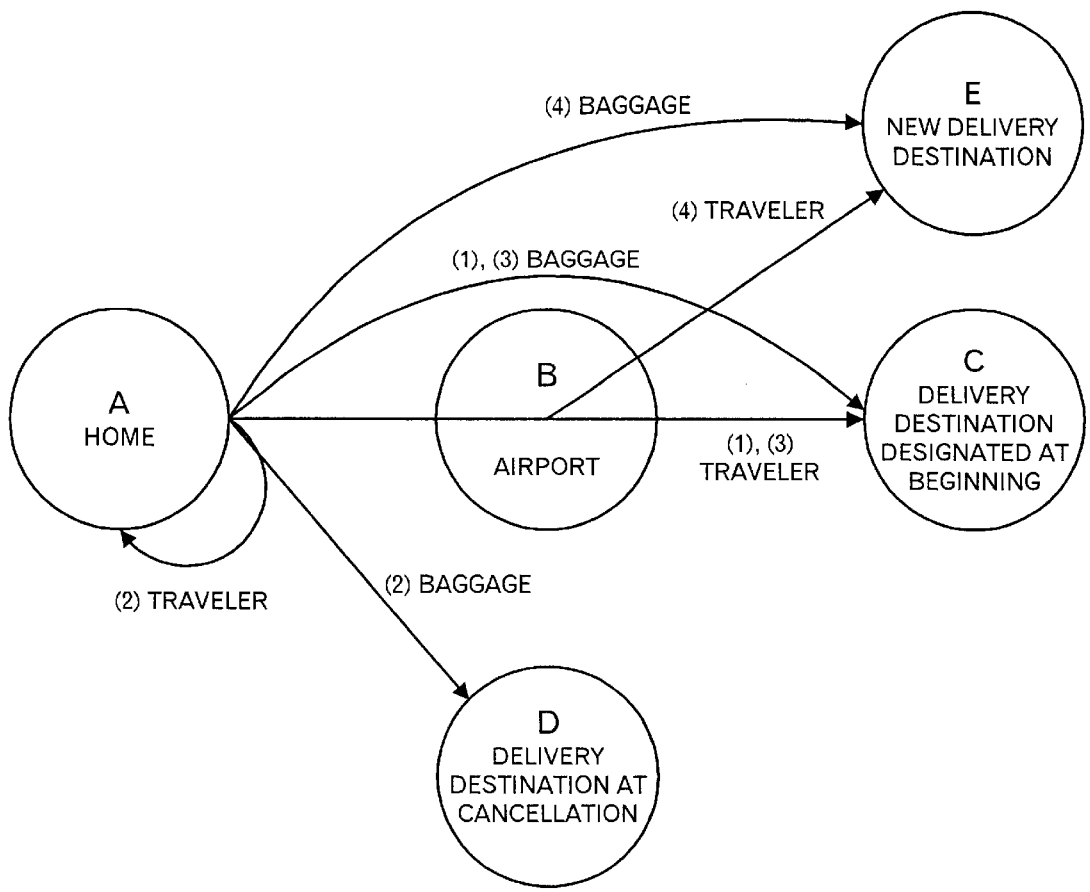
FIG. 2 is a drawing showing movement patterns of a traveler and a baggage in the embodiment of the invention.

Next, movement patterns of the baggage and the traveler in this embodiment are described using FIG. 2. (1) indicates a case where the traveler moves to a scheduled destination of the traveler, and the baggage is delivered to the delivery destination C, which was designated at the beginning. That is, the traveler leaves from the home A, boards a plane from an airport B, and arrives at the delivery destination C (travel destination), which was designated at the beginning. (2) indicates a case where the traveler cancels his or her travel, and the baggage is delivered to the delivery destination D at cancellation, which was designated by the traveler in advance (D may be the same as A.). The traveler stays in the home because of the cancellation of the travel, but the baggage is delivered to the delivery destination D at cancellation. (3) indicates a case where the traveler's destination is the same but the traveler changes his or her boarding flight, and the baggage is delivered to the delivery destination C, which was designated at the beginning. (4) indicates a case where the traveler changes his or her destination, and the baggage is delivered to a new delivery destination E designated by the traveler. That is, the traveler leaves from the home A, boards a plane from the airport B, and arrives at the new delivery destination E (travel destination). This embodiment can deal with any of these four patterns.

Hereinafter, processing flows of the system shown in FIG. 1 are explained using FIGS. 3 to 20. The traveler makes the PC terminal 2 access to the server 6 of the passenger carrier system 5, for example. Then, the PC terminal 2 receives web page data for boarding reservation, and displays it on the display device by a web browser. For example, this web page for the boarding reservation includes display of date and processing number, input or selection columns for inputting, designating, or selecting a passenger name or a name of boarding flight, and etc. When the traveler inputs or selects a passenger name, a name of a boarding flight and the like by using the PC terminal 2, and clicks a send button to instruct the transmission, the PC terminal 2 generates a message of boarding reservation data including a date, a flight name, a passenger name, and a processing number as shown in FIG. 4 and transmits it to the server 6 (step S1 in FIG. 3). The server 6 of the passenger carrier system 5 receives the message of the boarding reservation data from the PC terminal 2 and performs a processing for boarding reservation receipt step S2). Here, it is assumed that the processing for the boarding reservation receipt includes a processing for referring to the boarding DB 7 and confirming whether or not the boarding reservation is possible. If the boarding reservation is possible, the server 6 registers the received boarding reservation data in the boarding DB 7 as shown in FIG. 5 (step S3). In an example of FIG. 5, the boarding DB 7 includes a column of a date, a column of a flight name, a column of a boarding passenger name, a column of a processing number, a column of a boarding result, a column of a date after change, and a column of a flight name after change. At the time of step S3, data indicating a default state (for example, NULL) is stored in columns of the boarding result, date after change, and flight name after change.

Figures 6, 9:
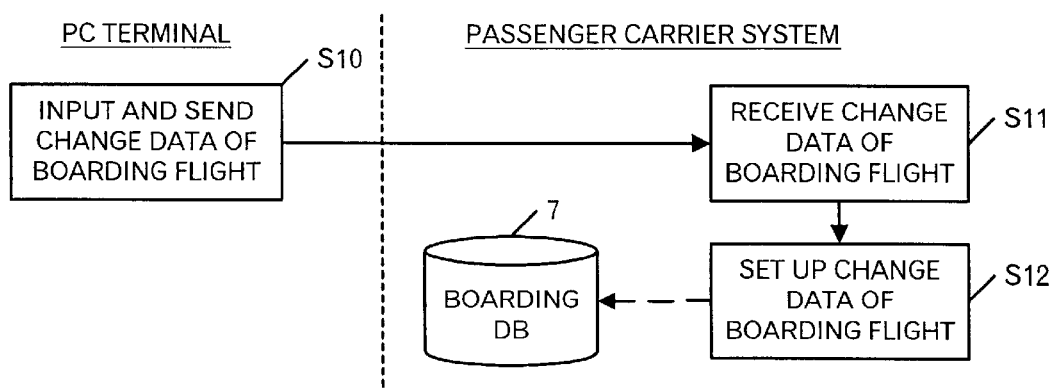
FIG. 6 is a drawing showing a display example of page data to apply the delivery of the baggage.
FIG. 9 is a drawing showing an example of a processing flow for changing a boarding flight.

Further, in order to deliver the baggage to the travel destination, the traveler makes the delivery receipt terminal 3 positioned, for example, in a drug store transmit a request for transmitting page data for the delivery application to the server 10 of the cargo carrier system 9, for example (step S4). In response to this request, the server 10 of the cargo carrier system 9 transmits the page data for the delivery application to the delivery receipt terminal 3 (step S5). The delivery receipt terminal 3 receives the page data for the delivery application from the server 10 of the cargo carrier system 9, and displays it on the display device (step S6). FIG. 6 shows a screen example of the page for the delivery application.

In an example of FIG. 6, the screen includes an input column of a name, an input column of a contact address, an input column of a delivery destination, an input column of a delivery destination at cancellation, input columns of information specifying the boarding flight, which includes a boarding date and a boarding flight. Besides, a send button for sending input data to the server 10 of the cargo carrier system 9 and a cancel button for canceling the application are also provided. The traveler inputs a name, a mail address of the cellular phone 4 as the contact address, a delivery destination of his or her baggage, and the information specifying the boarding flight, which includes the boarding date and boarding flight, and then, clicks the send button. In response to this operation, the delivery receipt terminal 3 transmits the aforementioned information as a message as shown in FIG. 7 to the server 10 of the cargo carrier system 9 (step S7).

When the server 10 of the cargo carrier system 9 receives data, which is transmitted from the delivery receipt terminal 3 and includes the name, the mail address of the cellular phone 4 as the contact address, the delivery destination of the baggage, the delivery destination at cancellation, which is a delivery destination to which the baggage has to be delivered when cancellation occurs, and the information specifying the boarding flight, which includes the boarding date and boarding flight name, it registered them in the contract DB 11 as shown in FIG. 8. In an example of FIG. 8, the contract DB 11 includes a column of a name, a column of a contact address, a column of a delivery destination, a column of information specifying the boarding flight, which includes a date and a boarding flight name, a column of a delivery destination at cancellation, and a column of a delivery flag. Incidentally, the column of the delivery flag stores any of a state "possible" which means the delivery is possible, a state "impossible" which means the delivery is impossible, a state "complete" which means the delivery is complete, and a state "NULL". The default value of the delivery flag is set to "impossible" or "NULL".

Besides, in the contract DB 11 shown in FIG. 8, the columns of the information specifying the boarding flight and the delivery destination at cancellation in "Sakura Fuji" stores the value "NULL" of the default state to indicate a case where "Sakura Fuji" sends the baggage without the use of the plane. For example, she applies the delivery of the baggage to simply send an acquaintance a gift and the like, and the information specifying the boarding flight and the delivery destination at cancellation are not inputted from the delivery receipt terminal 3 or the like. Or she applies the delivery without the use of the delivery receipt terminal 3.

Then, the server 10 registers the data transmitted from the delivery receipt terminal 3 at the step S8 in the contract DB 11, and performs a delivery instruction processing for a relay point (step S9). Namely, a pickup instruction note 31 for a delivery truck is printed by a printer not shown. It is possible to transmit a pickup instruction mail to a driver of the delivery truck. Incidentally, when the received data from the delivery receipt terminal 3 is registered in the contract DB 11, the delivery flag is set to a value indicating a default state such as "impossible" or "NULL". Therefore, at this time, only a delivery to the relay point is performed.

By doing so, it becomes possible for the traveler to carry out the boarding reservation to the passage carrier system 5 and the delivery application of the baggage in connection with the boarding reservation.

Next, a processing for changing the boarding flight based on the cancellation of the travel or the change of the boarding flight by the traveler is explained using the FIG. 9. In a case where the cancellation of the travel or the change of the boarding flight occurs, the traveler inputs the cancellation of the travel or the change of the boarding flight by using the PC terminal 2, for example. The traveler makes the PC terminal 2 access the server 6 of the passage carrier system 5. The PC terminal 2 receives web page data for applying the change of the boarding flight or the cancellation of the travel, and displays it on the display device by the web browser. After the traveler inputs the change of the boarding flight or the cancellation of the travel, the PC terminal 2 transmits change data relating to the cancellation of the travel or the change of the boarding flight to the server 6 of the passage carrier system 5 in response to the click of the send button (step S10). Here, in a case of the cancellation of the travel, the change data includes the date, the flight name, the passenger's name, and the processing number, which are initially inputted from the PC terminal 2, for example. In a case of the change of the boarding flight, the change data includes the date, the passenger's name, the processing number, which are initially inputted from the PC terminal 2, and the date after change, and the boarding flight name after change. The server 6 of the passenger carrier system 5 receives the change data and carries out a processing for receiving the change of the boarding flight (step S11). Here, the processing for receiving the change of the boarding flight includes a processing for referring to the boarding DB 7 and confirming whether or not the change of the boarding flight is possible, for example. Then, in a case where the change of the boarding flight is possible or in case of the cancellation, it carries out settings to change the boarding flight according to the received data for the boarding DB 7 (step S12). Namely, it registers the boarding result, which corresponds to the name of the passenger who inputs the change and the processing number, the date after change, and the boarding flight name after change in the boarding DB 7. In the case of cancellation, "cancellation" as the boarding result may be registered. For example, in a case where "Ichiro Yamato" changed the boarding date "April 1" to "April 2" and the boarding flight name "332" to "333", the server 6 of the passenger carrier system 5 registers "change" in the column of the boarding result, "April 2" in the column of the date after change, and "333" in the column of the boarding flight name after change in the line of "Ichiro Yamato" and the processing number "32211" of the boarding DB7.

Thus, the traveler can cancel the travel or change the boarding flight. Incidentally, it is desirable that the timing to notify the change or cancellation is before the boarding time of the initial boarding flight.

Figure 10:
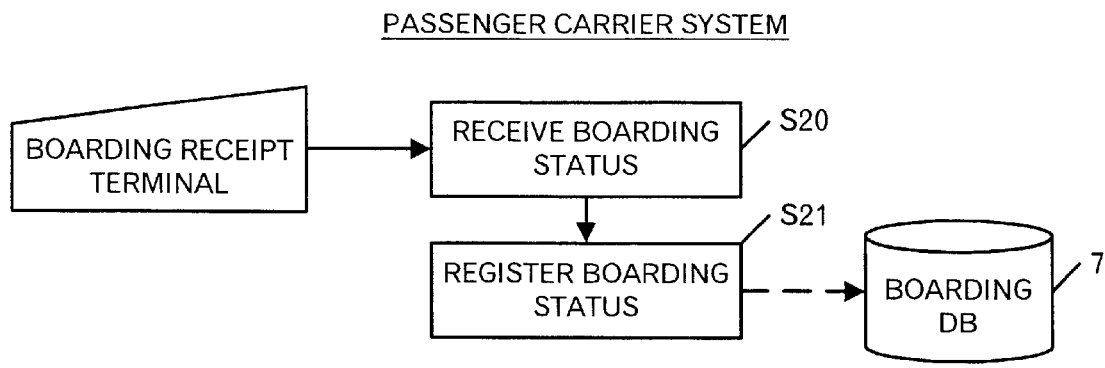
FIG. 10 is a drawing showing an example of a processing flow for boarding receipt.
Figure 11:
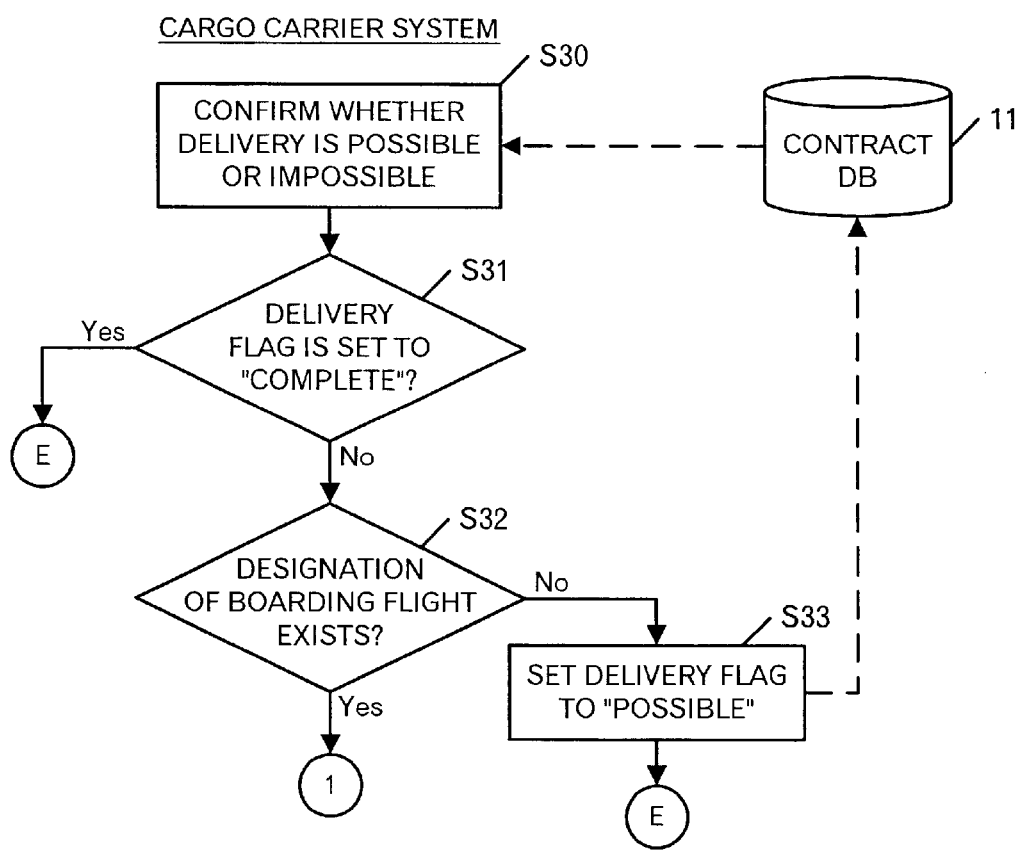
FIG. 11 is a drawing showing an example of a processing flow for specifying the delivery destination of the baggage.

Next, a processing for boarding receipt according to the boarding procedure of the traveler is explained using FIG. 10. When the traveler visits a boarding counter of an airport to carry out the boarding procedure of the traveler and an operator inputs data for boarding from the boarding receipt terminal 8, the boarding receipt terminal 8 transmits information of the name of the passenger who carried out the boarding procedure, and the like to the server 6 connected to the boarding receipt terminal 8 via a line. The server 6 receives the information of the name of the passenger and the like, and carries out the receipt of the boarding status (step S20), and registers the boarding status in the boarding DB 7 (step S21). Namely, when the operator inputs the boarding data such as the passenger's name "Hanako Fuji" and the boarding flight name "321" from the boarding receipt terminal 8, the server 6 of the passenger carrier system 5 records "boarding" in the column of the boarding result, which corresponds to the passenger's name "Hanako Fuji" in the boarding DB 7 as shown in FIG. 5.

Next, a processing for specifying the delivery destination of the baggage in the server 10 of the cargo carrier system 9 is explained using FIGS. 11 to 19. First, the server 10 of the cargo carrier system 9 reads out a record from the contract DB 11 at an arbitrary timing, and confirms whether or not it is possible to deliver the baggage relating to the record (step S30). That is, the server 10 of the cargo carrier system 9 checks whether or not the delivery flag of a record to be processed is set to "complete" (step S31) When the delivery flag is set to "complete" (step S31: Yes route), since a processing (step S82 in FIG. 20) for instructing the delivery of the baggage, as shown in later, is already carried out and the actual delivery is already started, processing proceeds to FIG. 19 via a terminal E, and the processing for this record is ended. On the other hand, when the delivery flag is not set to "complete" (step S31: No route), the server 10 determines whether or not there is designation of the boarding flight (step S32). In a case (step S32: No route) where there is no designation of the boarding flight, the server 10 sets the delivery flag in the contract DB 11 to "possible" (step S33). The case where there is no designation of the boarding flight means a delivery application without the use of the plane, like a case of "Sakura Fuji" as described above. In this case, there is no change of the delivery destination, the delivery flag is set to "possible", and the processing proceeds to the FIG. 19 via the terminal E and ends for this record.

On the other hand, when there is designation of the boarding flight (step S32: Yes route), the processing proceeds to the FIG. 12 via the terminal 1. Namely, it is a delivery application with the trip using the plane, and since the change of the boarding flight or cancellation might happen, following processing is carried out.

Then, the server 10 searches the timetable DB 12 using the boarding date and boarding flight name, which are included in the record to be processed, and confirms whether or not the departure time of the boarding flight of the traveler relating to the record to be processed has come (step S40 in FIG. 40). An example of data stored in the timetable DB 13 is shown in FIG. 13. In the example of FIG. 13, the timetable DB 13 includes a column of flight specifying information (for example, flight name), a column of a date, a column of departure time specifying information (departure time), and a column of a destination. Incidentally, data for this timetable DB 12 may be updated by downloading the timetable information from the passenger carrier system 5 at any time.

Then, the server 10 judges whether or not the departure time of the boarding flight of the traveler relating to the record to be processed has come on the basis of the date and the departure time specifying information in the timetable DB 12 (step S41). In a case (step S41: No route) where the departure time of the boarding flight of the traveler relating to the record to be processed has not come yet, the server 10 set the delivery flag relating to the record to be processed to "impossible" in the contract DB 11 (step S42). Then, the processing proceeds to FIG. 19 via the terminal E, and ends for this record to be processed. On the other hand, when the server 10 judges that the departure time of the boarding flight of the traveler relating to the record to be processed has come (step S41: Yes route), the server 10 transmits a message including the passenger's name (for example, "Ichiro Yamato") and the information specifying the boarding flight (for example, "322" flight), as shown in FIG. 14, to the server 6 of the passenger carrier system 5 via the Internet 1 to inquire the boarding (step S43).

When the server 6 of the passenger carrier system 5 receives the message for the boarding inquiry from the server 10 of the cargo carrier system 9, the server 6 receives the inquiry (step S44), refers to the boarding DB 7 shown in FIG. 5, and confirm the boarding status of the traveler relating to the received message (step S45). Incidentally, the server 6 may carries out an authentication processing of the server 10. Then, the server 6 refers to the boarding DB 7, reads out boarding information corresponding to the "Ichiro Yamato" and the boarding flight "322", generates a message including the date, the flightname, the passenger's name, the processing number, the boarding result, the date after change, and the flight name after change, as shown in FIG. 15 to transmit it as a reply of the boarding status, that is, boarding status information to the server 10 of the passenger carrier system 9 via the Internet 1 (step S46). The server 10 of the cargo carrier system 9 receives the reply of the boarding status, that is, the replied message via the Internet 1 (step S47), and temporarily stores it into a storage device. Then, it determines whether or not the traveler boards on the designated flight based on the replied message (step S48). For example, when the traveler of the record to be processed is "Hanako Fuji", since "Hanako Fuji" has already boarded, the message in which "boarding" is set as the boarding result is replied. Therefore, it means the delivery destination of the baggage is fixed to the delivery destination designated at the beginning. The server 10 sets the delivery flag corresponding to "Hanako Fuji" in the contract DB 11 to "possible" (step S49), and the processing for this record ends via the terminal E. This case of "Hanako Fuji" corresponds to the movement pattern (1) of the baggage and the traveler in FIG. 2, that is, a case where the traveler trips the scheduled travel destination and the baggage is also delivered to the delivery destination C designated at the beginning. On the other hand, in a case of "Ichiro Yamato" in FIG. 8, since the boarding result has been set to "changed" as shown in FIG. 15, the processing proceeds to FIG. 16 via terminal 2.

Figure 3:
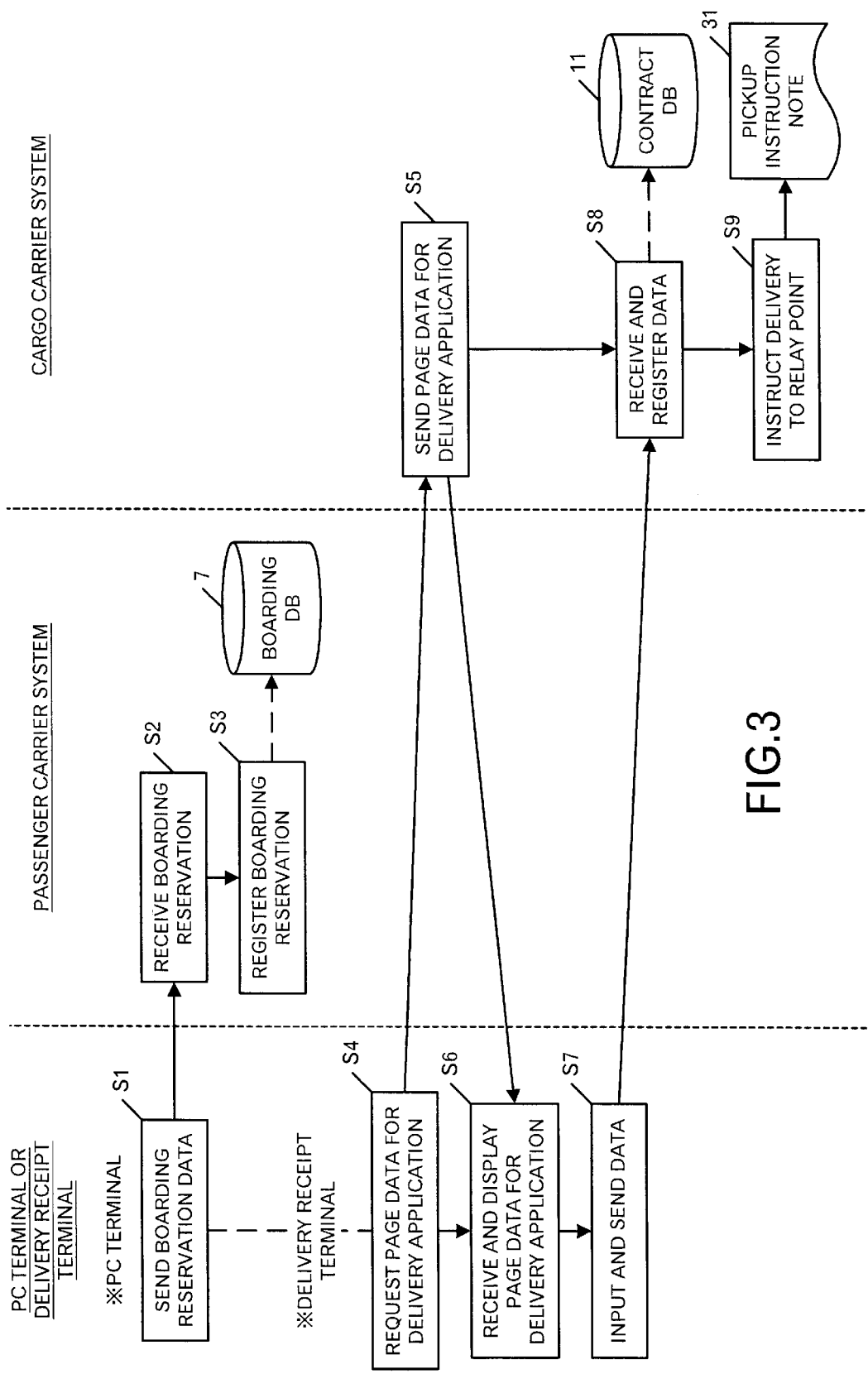
FIG. 3 is a drawing showing an example of a processing flow for boarding reservation and delivery application of the baggage.
Figure 17:
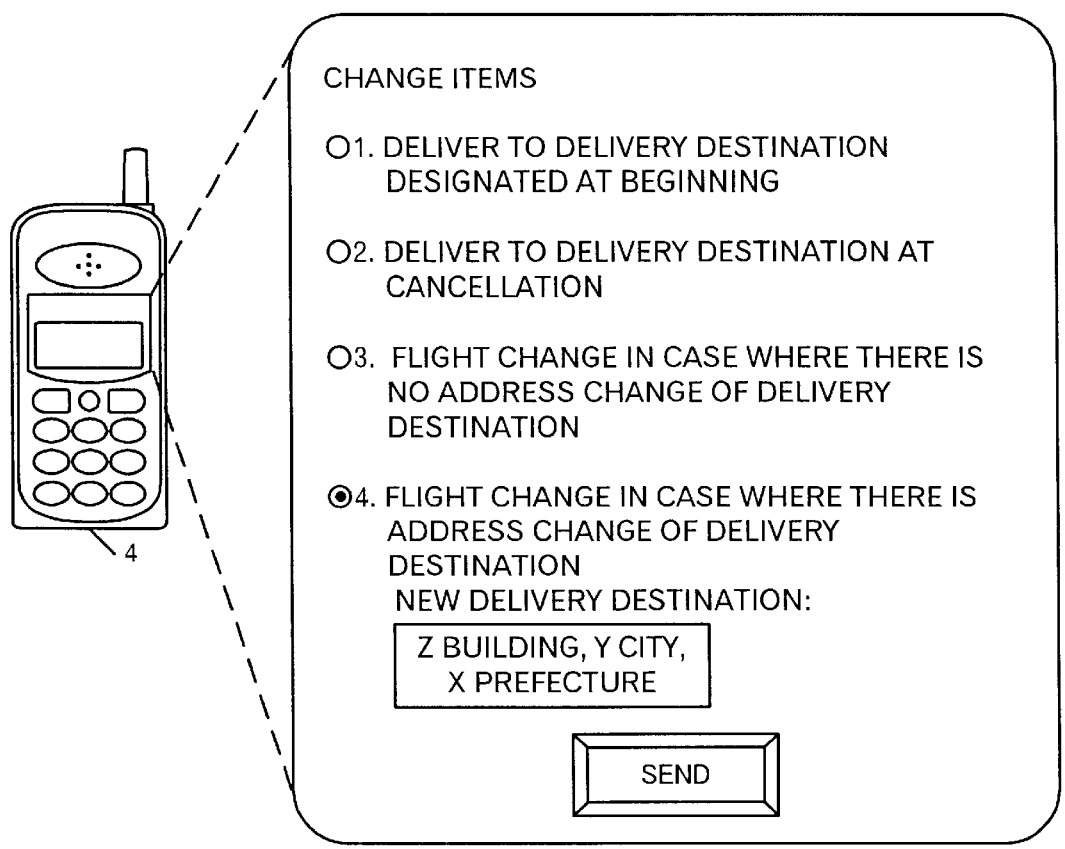
FIG. 17 is a drawing showing an example of a screen for inputting designation of a delivery destination in a cellular phone.
Figure 19:
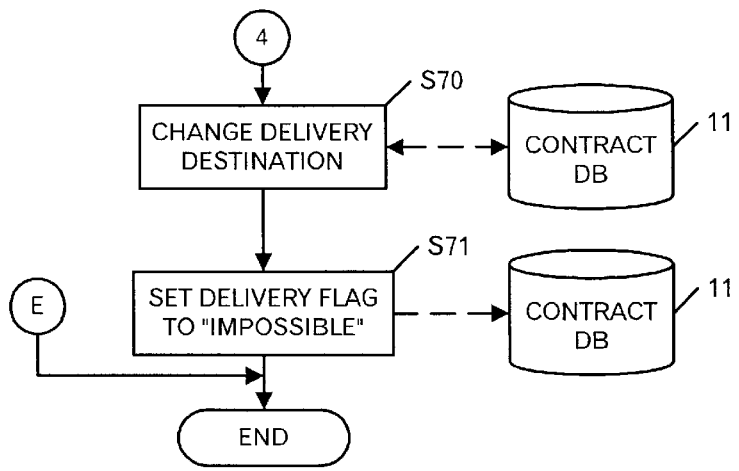
FIG. 19 is a drawing showing an example of a processing flow for specifying the delivery destination of the baggage.

It is not desirable to deliver the baggage of "Ichiro Yamato" to the delivery destination exactly designated by "ICHIRO YAMATO" from the delivery receipt terminal 3 (which is the same as the delivery destination inputted at the step S7 in FIG. 3) in view of a state in which the boarding flight has been changed. Therefore, in order to confirm the delivery destination of the baggage for "ICHIRO YAMATO", the server 10 reads out the contact address information (for example, mail address of the cellular phone 4) corresponding to "ICHIRO YAMATO" and the initial boarding flight "322" in the contract DB 11, and transmits a mail for confirming the delivery destination of the baggage, which is addressed to the cellular phone 4 (step S50). The cellular phone 4 receives the mail for confirming the delivery destination of the baggage, which is transmitted by the server 10, and displays it on the display device by the mailer (step S51). FIG. 17 shows an example of a screen display. Four radio buttons to designate the delivery destination of the baggage is provided in the example of FIG. 17. Namely, the choices are as follows: (1) deliver to the delivery destination designated at the beginning; (2) deliver to the delivery destination at cancellation; (3) flight change in a case where there is no address change of the delivery destination; and (4) flight change in a case where there is an address change of the delivery destination. Since there is an address change of the delivery destination in the case of (4), an input column for a new address of the delivery destination is provided. Besides, a send button is also provided to transmit input information to the server 10. Incidentally, FIG. 17 shows an example in which the mail content is described in a markup language such as HTML. However, it is not necessary to generate and send this kind of mail. For example, the server 10 sets up one URL for "ICHIRO YAMATO", and transmits a mail including a link to the URL and addressing to the cellular phone 4 to prompt to designate the change of the delivery destination. In this case, "ICHIRO YAMATO" operates the cellular phone 4 to receive the mail including the link to the URL, and clicks the link anchor to the URL. In response to this click, the browser of the cellular phone 4 accesses to the designated URL, receives web page data for causing it to display such a screen as shown in FIG. 17, and displays the web page on the display device.

Next, "ICHIRO YAMATO" selects the delivery destination of the baggage according to the display content on the display device of the cellular phone 4, inputs information of the new delivery destination, if necessary, and clicks the send button. Then, the cellular phone 4 transmits the selected and inputted data to the server 10 of the cargo carrier system 9 via the Internet 1 (step S52). The server 10 of the cargo carrier system 9 receives the selected and inputted data by "ICHIRO YAMATO" from the cellular phone 4, and temporarily stores it in the storage device (step S53).

Next, the server 10 determines the delivery destination of the baggage designated by "ICHIRO YAMATO". Namely, the server 10 judges whether or not the first item "deliver to the delivery destination at the beginning" shown in FIG. 17 is selected by "ICHIRO YAMATO" (step S54). If the first item is selected (step S54: Yes route), it means the delivery destination of the baggage is the delivery destination designated at the beginning. Therefore, the processing for this record to be processed ends via the terminal E. On the other hand, if "deliver to the delivery destination at the beginning" is not selected (step S54: No route), next the server 10 judges whether or not the second item "deliver to the delivery destination at cancellation" shown in FIG. 17 is selected (step S56). If the second item is selected (step S56: Yes route), the server 10 carries out a processing for changing the delivery destination to the delivery destination at cancellation (step S57) Namely, the information of the delivery destination in the contract DB 11 is updated by the information of the delivery destination at cancellation. After this processing ends, the server 10 sets the delivery flag corresponding to "ICHIRO YAMATO" and the flight number "322" to "possible" to deliver the baggage to the delivery destination at cancellation (step S58), and the processing for this record is ended via the terminal E. This case means the movement pattern (2) of the baggage and traveler in FIG. 2, that is, a case where the traveler cancels his or her travel and the baggage is delivered to the delivery destination D at cancellation designated by the traveler in advance.

Figure 18:
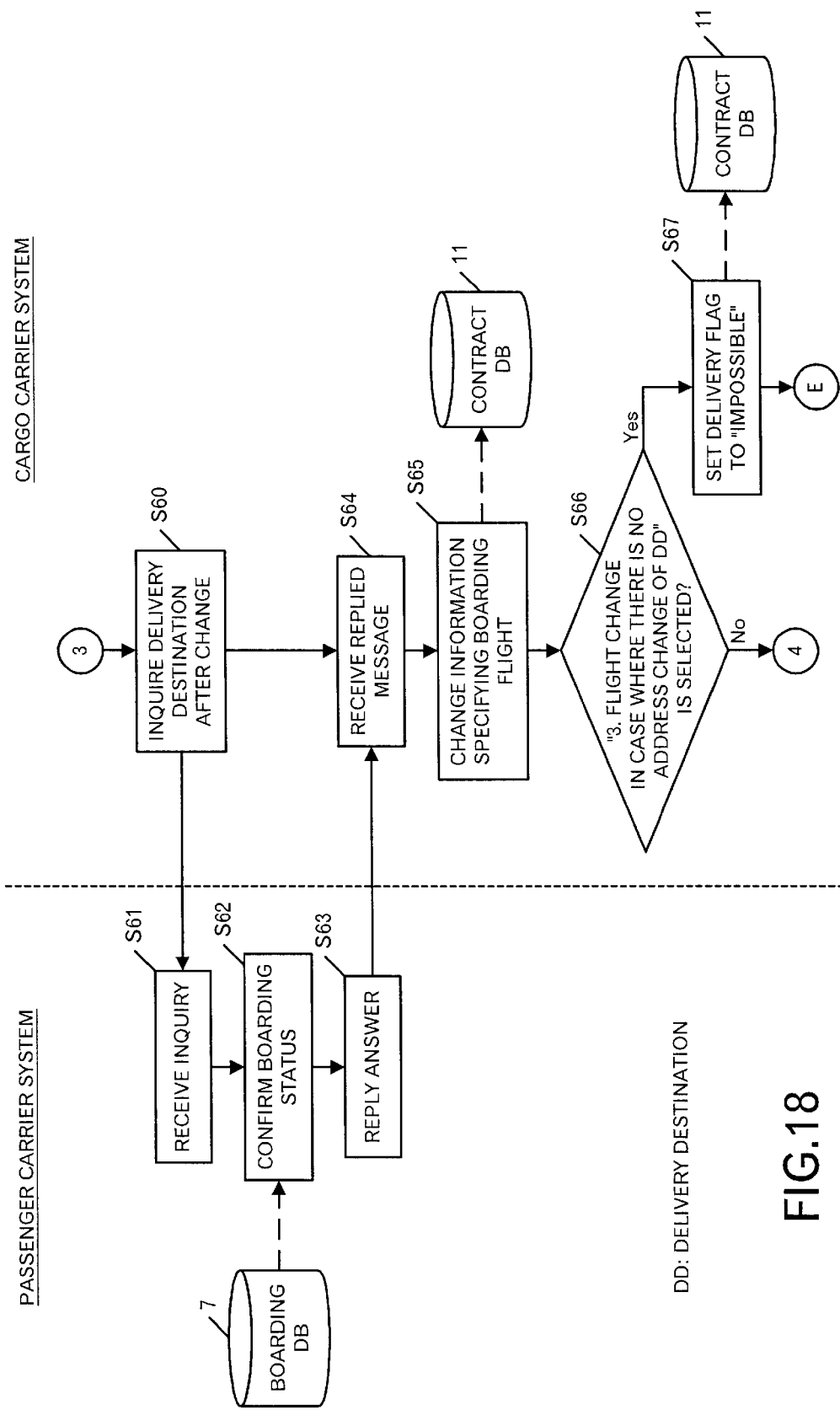
FIG. 18 is a drawing showing an example of a processing flow for specifying the delivery destination of the baggage.

On the other hand, if the second item "deliver to the delivery destination at cancellation" is not selected, the processing proceeds to FIG. 18 via the terminal 3. Here, the server 10 transmits a message including the passenger's name "ICHIRO YAMATO" and the information specifying the boarding flight, which is "333" after change, of this record to be processed via the Internet 1 to the server 6 of the passenger carrier system 5 to just make sure that he surely has boarded on the flight "333", and inquires the boarding flight name after change (step S60).

Figure 12:
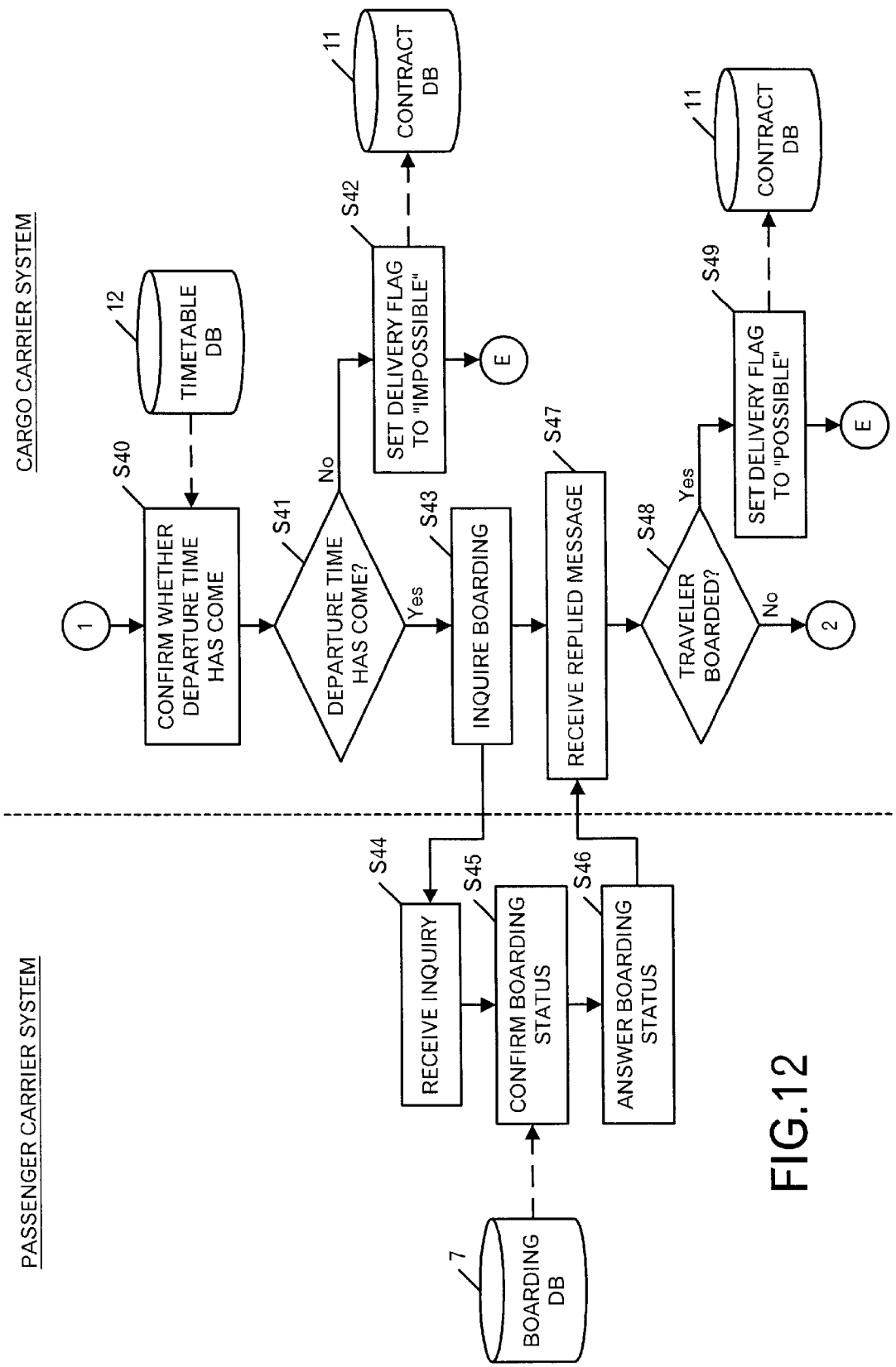
FIG. 12 is a drawing showing an example of a processing flow for specifying the delivery destination of the baggage.
Figure 16:
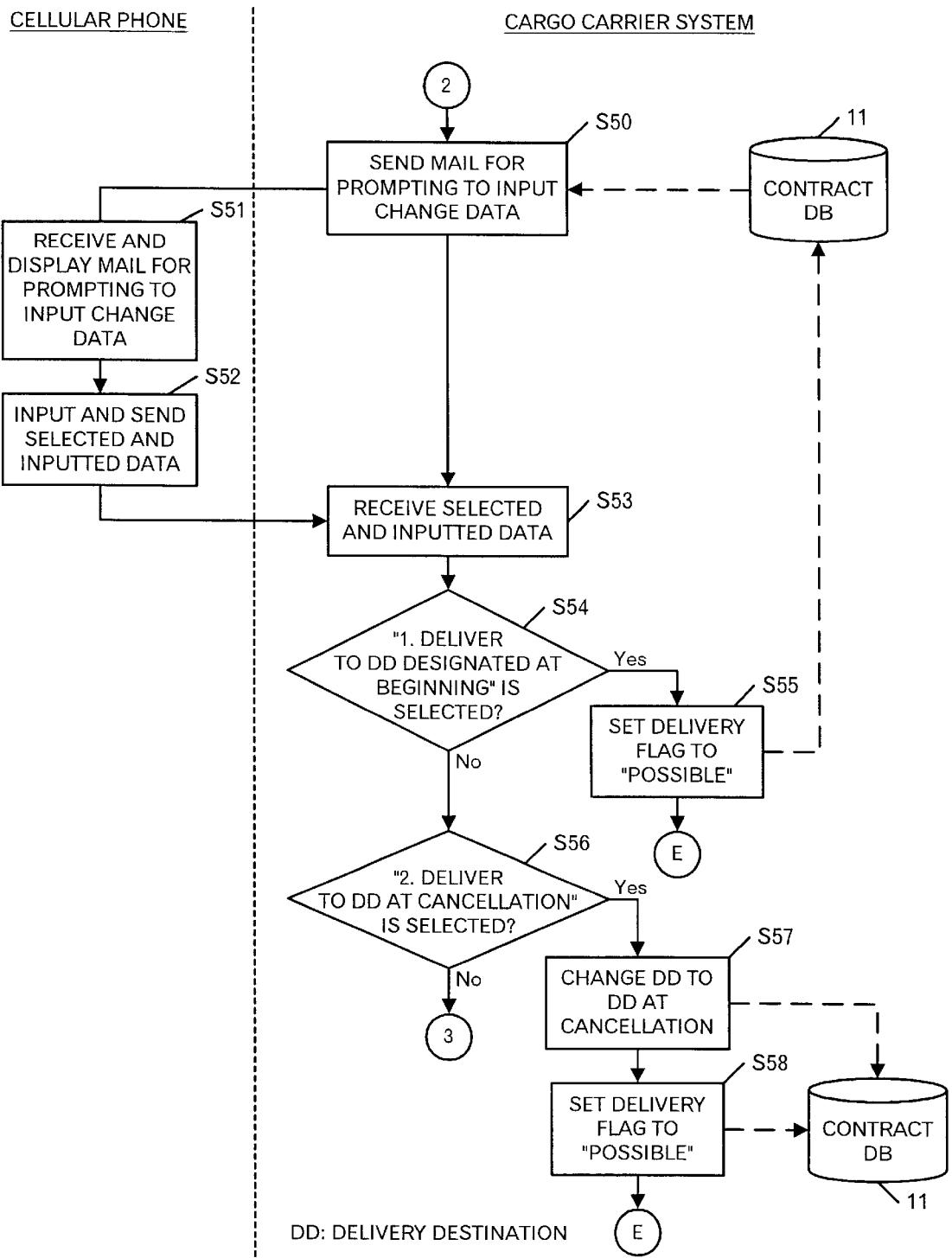
FIG. 16 is a drawing showing an example of a processing flow for specifying the delivery destination of the baggage.

When the server 6 of the passenger carrier system 5 receives the inquiry of the boarding flight name (step S61), it refers to the boarding DB 7 shown in FIG. 5 and confirms the boarding status of the traveler specified by the received message (step S62). Namely, the server 6 refers to the boarding DB 7, reads out the boarding information corresponding to "ICHIRO YAMATO" and the flight "322" or "333" after change, and replies a message as shown in FIG. 15 as the boarding status reply to the server 10 of the cargo carrier system 9 via the Internet 1 (step S63). The server 10 of the cargo carrier system 9 receives the replied message concerning the boarding status reply (step S64), and performs a processing for changing the information specifying the boarding flight in the contract DB 11 based on the replied message (step S65). At this stage, information of the boarding date and the boarding flight name after change is received and the contract DB 11 is updated by this information. Incidentally, the reason to update the contract DB 11 at this stage is that only information "not boarded" might be received in the information specifying the boarding flight, which was received at the step S47 (FIG. 12). Here, the possibility to be able to acquire information of the boarding flight after change is high, since the flight change is confirmed by the traveler just before.

Next, the server 10 determines whether or not the third item "flight change in a case where there is no address change of the delivery destination" is selected (step S66). In a case (step S66: Yes route) where the third item is selected, the server 10 sets the delivery flag corresponding to "ICHIRO YAMATO" and the flight "322" in the contract DB 11 to "impossible" (step S67). Then, the processing for this record to be processed is ended via the terminal E. This case falls into the movement pattern (3), that is, a case where the traveler changes the boarding flight but the travel destination is the same and the baggage is delivered to the delivery destination designated at the beginning. Incidentally, setting the delivery flag to "impossible" at the step S67 is because the boarding flight is changed to the flight whose departure time is later than that of initially designated flight, and the departure time of the boarding flight after change have not come yet. However, when the departure time of the boarding flight after change has come, the processing from step S41 to S49 in FIG. 12 is carried out. If it is confirmed that the traveler boards on the flight after change (step S48: Yes route), in order to deliver the baggage to the delivery destination designated at the beginning, the server 10 sets the delivery flag corresponding to "ICHIRO YAMATO" in the contract DB 11 to "possible" (step S67). Then, the processing for this record is ended via terminal E.

On the other hand, if the third item "flight change in a case where there is no address change of the delivery destination" is not selected (step S66: No route), the processing proceeds to FIG. 19 via the terminal 4. This is a processing based on the fourth item "flight change in a case where there is an address change of the delivery destination" is selected and the new delivery destination is designated. The server 10 performs a processing for changing the delivery destination based on the new delivery destination information received from the cellular phone 4 (step S70). That is, the server 10 updates the delivery destination information in the contract DB 11 to the new designated delivery destination. Then, the server 10 sets the delivery flag corresponding to "ICHIRO YAMATO" and the flight "322" in the contract DB 11 to "impossible" (step S71). Then, the processing ends. This case falls into the movement patter (4) of the traveler and the baggage, which is shown in FIG. 2, that is, a case where the traveler changes his or her travel destination and the baggage is delivered to the new delivery destination E designated by the traveler. Incidentally, setting the delivery flag to "impossible" at the step S71 is because the departure time of the boarding flight after change has not come yet and there is possibility to be changed again. However, when the departure time of the boarding flight after change has come, the processing from the step S41 to S49 in FIG. 12 is carried out. Then, if it is confirmed that the traveler boards on the flight after change (step S48: Yes route), in order to deliver the baggage to new delivery destination, the server 10 sets the delivery flag in the contract DB 11 to "possible" (step S49), and the processing is ended via the terminal E.

By doing such a processing, this embodiment can deal with the change of the travel destination and the cancellation of the travel by the traveler in a form covering all the movement pattern of the baggage and the traveler shown in FIG. 2. Incidentally, it is necessary to repeat the step 30 in FIG. 11 to step S71 in FIG. 19 at any time.

Figure 20:
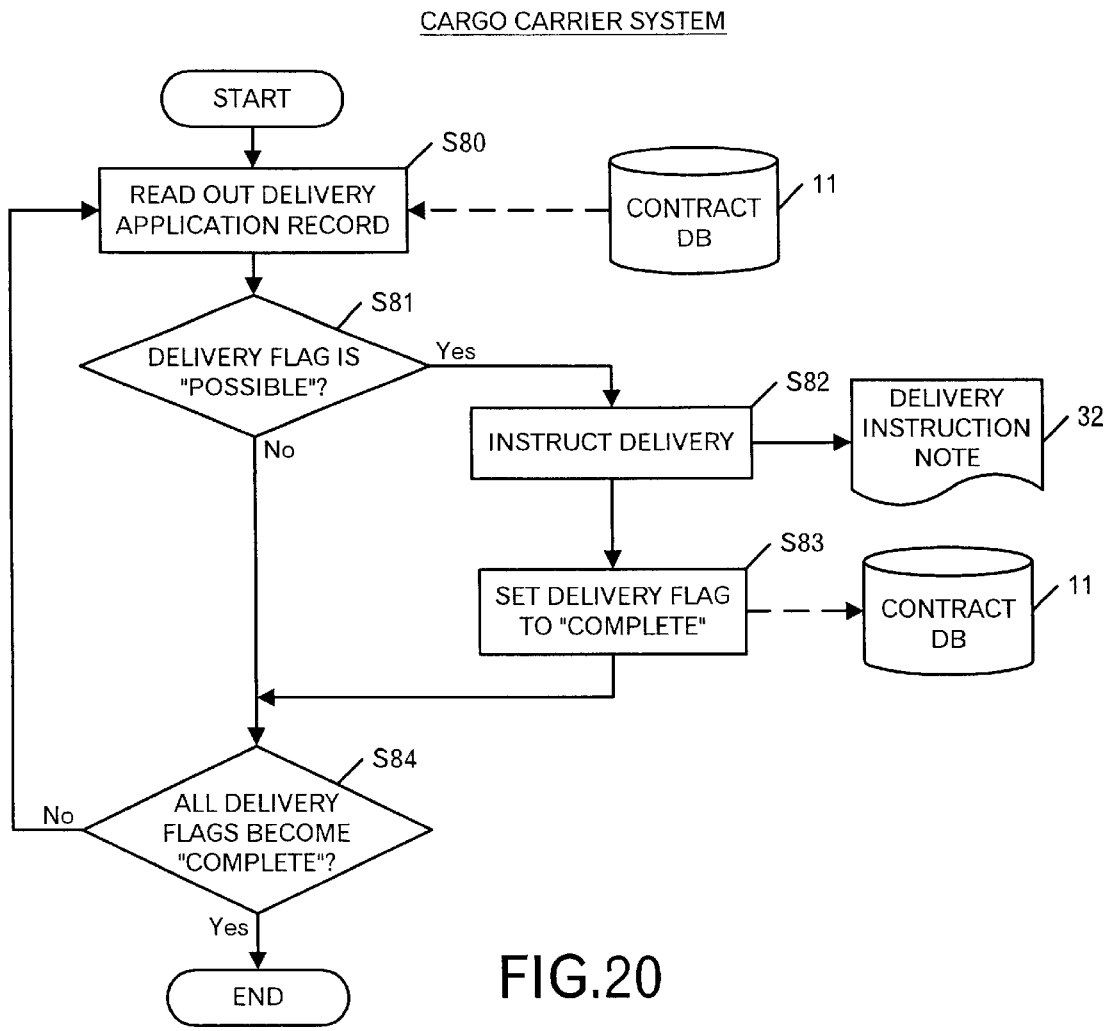
FIG. 20 is a drawing showing an example of a processing flow for instructing the delivery of the baggage.

Finally, the processing for instructing the delivery by the server 10 of the cargo carrier system 9 is explained using FIG. 20. First, the server 10 reads out a delivery application record from the contract DB 11 (step S80), and determines whether or not the delivery flag included in the delivery application record is set to "possible" (step S81). If the delivery flag is set to "possible" (step S81: Yes route), it carries out a processing for instructing the delivery (step S82). That is, since the delivery destination is specified, it prints out the delivery instruction note 32 including the name, the contact address, and the delivery destination of the delivery application record by a printer not shown. The staff of the cargo carrier delivers the baggage from the relay point based on the printed delivery instruction note 32. After the processing for instructing the delivery completes, the server 10 sets the delivery flag to "complete" (step S83), and the processing proceeds to step S84. Although the delivery flag is set to "complete" at the time of the completion of the processing for instructing the delivery in this embodiment, the timing of setting the delivery flag to "complete" may be at the time of the actual completion of the delivery.

On the other hand, if the delivery flag is not set to "possible" (step S81: No route), the server 10 determines whether or not all the delivery flags in the contract DB 11 are set to "complete" (step S84). That is, until all the delivery flags are set to "complete" and the delivery instruction notes 32 for all the records are printed out, a processing from the steps S80 to S83 is repeated. Then, if all the delivery flags are set to "complete" (step S84: Yes route), the processing ends.

As described above, this embodiment of this invention can securely deliver the baggage of the traveler to the designated delivery destination even in the case where the traveler cancels the trip or changes the destination.

Although one embodiment of the invention is explained, this invention is not limited to this embodiment. Namely, in a case where there is cancellation of the trip or change of the travel destination, a mail to confirm the delivery destination, which is addressed to the cellular phone 4, is transmitted at the step S50 in FIG. 16, but the mail addressing to the PC terminal 2 in his or her home may be transmitted. This is realized by setting the mail address at the time of delivery application by the traveler.

Besides, in a case where there is cancellation of the travel or change of the travel destination, although the delivery destination information registered in the contract DB 11 is updated to the delivery destination information designated from the cellular phone 4, the delivery destination information designated from the cellular phone 4 may be registered into another storage area in the contract DB 11 or a storage device other than the contract DB 11.

Further, the delivery receipt terminal 3 may be a cellular phone 4 or PC terminal 2 owned by the traveler. Although only one server 6 of the passenger carrier system 5 is shown in FIG. 1, the functions described above may be realized by a plurality of computers. In addition, the passenger carrier system 5 and the cargo carrier system 9 in the embodiment may be unified. Incidentally, although all the computers are connected with the Internet 1, the passenger carrier system 5 and the cargo carrier system 9 are connected with, for example, the private line, or VPN (Virtual Private Network). Further, although an example in which the PC terminal 2 is used to reserve the flight is shown, the flight reservation may be performed by this delivery receipt terminal 3 in accordance with services provided from the center server connected with the delivery receipt terminal 3. Besides, as for only the flight reservation, it is also possible to reserve the flight via a call center of the passenger carrier or a travel agency. In addition, at the delivery application, a server connected to the delivery receipt terminal 3 may not be the server 10 of the cargo carrier system 9, but a center server separately installed, and information for the delivery application may be transmitted from this center server to the server 10.

The screen examples shown in FIG. 6 and FIG. 17 are mere examples, and another screen configuration with similar contents may be adopted. Besides, each of these screens may be divided into a plurality of screens, and the plurality of screens may be presented to the user in an arbitrary order and prompts the user to input data. Particularly, since the display area of the display device in the cellular phone 4 has a limit, there is a case where the plurality of screens are preferable for seeing the contents.

Besides, although a case where the traveler boards on the plane in the example described above, this invention can apply to any of transportation means other than plane if the boarding reservation and boarding procedure are needed.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A computerized method for managing a delivery destination of a baggage, said method comprising:

receiving and registering into a storage device, identification information of a traveler, information of a contact address, boarding information, and information concerning a destination of a baggage from a delivery receipt terminal operated by said traveler;

acquiring information concerning a boarding status of said traveler from a passenger carrier server for managing boarding status of said traveler;

if there is inconsistency between said information concerning said boarding status of said traveler, which is acquired in said acquiring operation, and said boarding information registered in said storage device, inquiring of the traveler about delivery destination of the baggage based on the information of the contact address of the traveler; and registering information concerning said delivery destination of said baggage, which is notified from said traveler in response to said inquiry by said inquiring operation.

2. The computerized method as set forth in claim 1, wherein in said registering said information concerning said delivery destination of said baggage, said information concerning said delivery destination of said baggage, which is registered at said receiving and registering operation, is updated by said information concerning said delivery destination of said baggage, which is notified from said traveler.

3. The computerized method as set forth in claim 1, wherein in said registering information concerning said delivery destination of said baggage, if designation of a new delivery destination of said baggage is received as said delivery destination of said baggage from said traveler in response to said inquiry by said inquiring operation, said information concerning said delivery destination of said baggage, which is registered in said storage device, is updated by using information of said new delivery destination of said baggage.

4. The computerized method as set forth in claim 1, wherein in said acquiring operation, said information concerning said boarding status of said traveler, which corresponds to said boarding information, is requested to said passenger carrier server at a timing according to a departure time specified by said boarding information.

5. The computerized method as set forth in claim 1, wherein in said inquiring operation, information for prompting said traveler to designate said delivery destination is notified to a mail address registered as said contact address.

6. The computerized method as set fort in claim 1, further comprising outputting a delivery instruction including information of said delivery destination of said baggage based on said information concerning said delivery destination of said baggage, which is registered in said storage device.

7. The computerized method as set forth in claim 6, wherein a storage area for a delivery flag is provided in said storage device, and said delivery flag is set to a state indicating delivery possible in at least a case where there is consistency between said information concerning said boarding status of said traveler and said boarding information registered in said storage device, and said outputting operation is executed in a case where said delivery flag is set to the state indicating delivery possible.

8. The computerized method as set forth in claim 1, wherein said information concerning said delivery destination of said baggage, which is registered in said storage device at said receiving and registering operation, includes normal delivery destination information of said baggage and delivery destination information of said baggage at cancellation of said travel.

9. The computerized method as set forth in claim 8, wherein in said registering said information concerning said delivery information of said baggage, if designation of said delivery destination, which is notified from said traveler, is designation of said delivery destination of said baggage at said cancellation of said travel, said normal delivery destination information of said baggage is updated by said delivery destination information of said baggage at said cancellation of said travel.

10. A program embodied on a medium to cause a computer to manage a delivery destination of a baggage, said program comprising:

receiving and registering into a storage device, identification information of a traveler, information of a contact address, boarding information, and information concerning a destination of a baggage from a delivery receipt terminal operated by said traveler;

acquiring information concerning a boarding status of said traveler from a passenger carrier server to manage boarding status of said traveler;

if there is inconsistency between said information concerning said boarding status of said traveler, which is acquired in said acquiring operation, and said boarding information registered in said storage device, inquiring of the traveler about delivery destination of the baggage based on the information of the contact address of the traveler; and registering information concerning said delivery destination of said baggage, which is notified from said traveler in response to said inquiry by said inquiring operation.

11. The program as set forth in claim 10, wherein in said registering said information concerning said delivery destination of said baggage, said information concerning said delivery destination of said baggage, which is registered at said receiving and registering operation, is updated by said information concerning said delivery destination of said baggage, which is notified from said traveler.

12. The program as set forth in claim 10, wherein in said registering information concerning said delivery destination of said baggage, if designation of a new delivery destination of said baggage is received as said delivery destination of said baggage from said traveler in response to said inquiry by said inquiring operation, said information concerning said delivery destination of said baggage, which is registered in said storage device, is updated by using information of said new delivery destination of said baggage.

13. The program as set forth in claim 10, wherein in said acquiring operation, said information concerning said boarding status of said traveler, which corresponds to said boarding information, is requested to said passenger carrier server at a timing according to a departure time specified by said boarding information.

14. The program as set forth in claim 10, wherein in said inquiring operation, information for prompting said traveler to designate said delivery destination is notified to a mail address registered as said contact address.

15. The program as set fort in claim 10, further comprising outputting a delivery instruction including information of said delivery destination of said baggage based on said information concerning said destination of said baggage, which is registered in said storage device.

16. The program as set forth in claim 15, wherein a storage area for a delivery flag is provided in said storage device, and said delivery flag is set to a state indicating delivery possible in at least a case where there is consistency between said information concerning said boarding status of said traveler and said boarding information registered in said storage device, and said outputting operation is executed in a case where said delivery flag is set to the state indicating delivery possible.

17. The program as set forth in claim 10, wherein said information concerning said delivery destination of said baggage, which is registered in said storage device at said receiving and registering operation, includes normal delivery destination information of said baggage and delivery destination information of said baggage at cancellation of said travel.

18. The program as set forth in claim 17, wherein in said registering said information concerning said delivery information of said baggage, if designation of said delivery destination, which is notified from said traveler, is designation of said delivery destination of said baggage at said cancellation of said travel, said normal delivery destination information of said baggage is updated by said delivery destination information of said baggage at said cancellation of said travel.

19. An apparatus to manage a delivery destination of a baggage, comprising:
- a receiving and registering unit of a storage device, to receive and register identification information of a traveler, information of a contact address, boarding information, and information concerning a destination of a baggage from a delivery receipt terminal operated by said traveler;
- an information acquirer to acquire information concerning a boarding status of said traveler from a passenger carrier server to manage boarding status of said traveler;
- an inquiry unit to inquire of the traveler about delivery destination of the baggage based on the information of the contact address of the traveler, if there is inconsistency between said information concerning said boarding status of said traveler, which is acquired by said information acquirer, and said boarding information registered in said storage device; and
- an information registration unit to register information concerning said delivery destination of said baggage, which is notified from said traveler in response to said inquiry by said inquiry unit.

20. The apparatus as set forth in claim 19, wherein in said information registration unit to register said information concerning said delivery destination of said baggage updates said information concerning said delivery destination of said baggage, which is registered by said receiving and registering unit, by said information concerning said delivery destination of said baggage, which is notified from said traveler.

21. The apparatus as set forth in claim 19, wherein, if designation of a new delivery destination of said baggage is received as said delivery destination of said baggage from said traveler in response to said inquiry by said inquiry unit, said information registration unit to register information concerning said delivery destination of said baggage updates said information concerning said delivery destination of said baggage, which is registered in said storage device, by using information of said new delivery destination of said baggage.

22. The apparatus as set forth in claim 19, wherein said information acquirer requests said information concerning said boarding status of said traveler, which corresponds to said boarding information, to said passenger carrier server at a timing according to a departure time specified by said boarding information.

23. The apparatus as set forth in claim 19, wherein said inquiry unit notifies a mail address registered as said contact address of information to prompt said traveler to designate said delivery destination.

24. The apparatus as set fort in claim 19, further comprising an output unit to output a delivery instruction including information of said delivery destination of said baggage based on said information concerning said destination of said baggage, which is registered in said storage device.

25. The apparatus as set forth in claim 24, wherein a storage area for a delivery flag is provided in said storage device, and said delivery flag is set to a state indicating delivery possible in at least a case where there is consistency between said information concerning said boarding status of said traveler and said boarding information registered in said storage device, and said output unit operates in a case where said delivery flag is set to the state indicating delivery possible.

26. The apparatus as set forth in claim 19, wherein said information concerning said delivery destination of said baggage, which is registered in said storage device at said receiving and registering unit, includes normal delivery destination information of said baggage and delivery destination information of said baggage at cancellation of said travel.

27. The apparatus method as set forth in claim 26, wherein, if designation of said delivery destination, which is notified from said traveler, is designation of said delivery destination of said baggage at said cancellation of said travel, said information registration unit to register said information concerning said delivery information of said baggage updates said normal delivery destination information of said baggage by said delivery destination information of said baggage at said cancellation of said travel.

* * * * *